(12) United States Patent
Luick

(10) Patent No.: US 7,266,721 B2
(45) Date of Patent: Sep. 4, 2007

(54) RUNTIME REPAIRABLE PROCESSOR

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 10/670,716

(22) Filed: Sep. 25, 2003

(65) Prior Publication Data

US 2005/0071406 A1  Mar. 31, 2005

(51) Int. Cl.
*G06F 11/00* (2006.01)
(52) U.S. Cl. .......................... 714/10; 326/10
(58) Field of Classification Search ............ 326/9, 326/10
See application file for complete search history.

(56) References Cited

U.S. PATENT DOCUMENTS

| | | | | |
|---|---|---|---|---|
| 4,722,084 A | * | 1/1988 | Morton ........................ | 714/3 |
| 4,890,285 A | * | 12/1989 | Dichiara ..................... | 714/55 |
| 4,970,724 A | * | 11/1990 | Yung ........................... | 714/3 |
| 5,276,893 A | * | 1/1994 | Savaria ....................... | 714/10 |
| 6,021,511 A | * | 2/2000 | Nakano ....................... | 714/48 |
| 6,067,633 A | * | 5/2000 | Robbins et al. ............... | 714/1 |
| 6,697,979 B1 | * | 2/2004 | Vorbach et al. ............. | 714/724 |
| 6,730,527 B1 | * | 5/2004 | Norman ........................ | 438/4 |
| 6,785,841 B2 | * | 8/2004 | Akrout et al. ................ | 714/11 |
| 7,017,074 B2 | * | 3/2006 | Okin ........................... | 714/11 |
| 7,185,225 B2 | * | 2/2007 | Sutardja et al. .............. | 714/11 |

OTHER PUBLICATIONS

IEEE 100 The Authoritative Dictionary of IEEE Standards Terms, "circular shift", Dec. 2000, Standards Information Network IEEE Press, Seventh Edition, p. 171.*
"Adder (electronics)", no date given, Wikipedia.org.*
"Arithmetic logic unit", no date given, Wikipedia.org.*
David Ginsberg, "Simple ALU Layout with the Cadence Suite", no date given <http://www.ee.ucr.edu/~rlake/EE134/D.Ginsberg_report.pdf>.*
Singh, "Interstitial Redundancy: An Area Efficient Fault Tolerance Scheme for Large Area VLSI Processor Arrays", 1998, IEEE.*

* cited by examiner

*Primary Examiner*—Gabriel L. Chu
(74) *Attorney, Agent, or Firm*—Bockhop & Associates

(57) ABSTRACT

A self repairable processor that provides a reliable computing result without increasing the footprint of the on-chip devices. The processor has a plurality of data registers connected to two identical functional units, where only one of the functional units is enabled for computing, the two functional units being placed in a chip area defined at most by data paths needed for one functional unit. When an error condition is detected in the active functional unit, the processor disables the functional unit with an error condition and enables the duplicate functional unit.

16 Claims, 3 Drawing Sheets

US 7,266,721 B2

RUNTIME REPAIRABLE PROCESSOR

BACKGROUND OF THE INVENTION

1. Field of the Invention

The present invention generally relates to computing devices. More specifically, the present invention relates to a processor architecture.

2. Description of the Related Art

Current and future superscalar and very large instruction word (VLIW) processor execution units have highly wire limited implementation caused by the requirement of forwarding results from multiple execution units to each other at frequencies above 10 GHz and the fact of, in 65 nm or less lithography in CMOS technologies, bus wiring scales very poorly.

This lack of scaling is very much exacerbated by high-frequency skin effects in conductors that limit conductivity to only surfaces of wires. Generally, the data path wiring must be overscaled so that their size is limited. However, the FET devices themselves are very small, especially n devices that form the great preponderance of gates in high-speed dynamic designs such as adders, rotators, and register files. Thus, wiring limited designs, where FET devices are little more than half of the total area, are apparently wasteful of chips space in the absence of real implementations. These designs are, thus, totally wiring limited in both horizontal and vertical dimensions.

Further, each successive CMOS generation more than doubles the power density for functional units as the frequency and density increase with increased pipelining. Today's 130 μm chips already have power densities at or near the practical limits at 2-3 GHz. Thus, it is virtually impossible to make run time functional use of the unused devices under wire limited functional units.

SUMMARY OF THE INVENTION

The invention introduces a way to provide reliable computing by using unused on-chip devices under wire limited functional units. In one embodiment, the invention is a runtime repairable processor within a single silicon chip. The runtime repairable processor includes a plurality of data registers, a first computing unit, an area of the silicon chip defined by a plurality of data paths for connecting the plurality of data registers to the first computing unit, and a second computing unit. The second computing unit is a duplicate of the first computing unit and is connected to the plurality of data registers, and the first computing unit and the second computing unit are placed within the area.

In another embodiment, the invention is a method for providing fault tolerant computing through a single chip runtime repairable processor. The method includes the steps of connecting a plurality of data registers to a first computing unit through a plurality of data paths, defining a chip area that covers the plurality of the data paths, placing a second computing unit within the area, connecting the plurality of data registers to the second computing unit, detecting an error condition in the first computing unit, in response to detecting the error condition, disabling the first computing unit, and in response to disabling the first computing unit, enabling the second computing unit. The first computing unit and the plurality of data registers are confined within the area, and the second computing unit is a duplicate of the first computing unit.

Other objects, advantages, and features of the present invention will become apparent after review of the herein-after set forth in Brief Description of the Drawings, Detailed Description of the Invention, and the Claims.

DETAILED DESCRIPTION OF THE INVENTION

Figure 1:
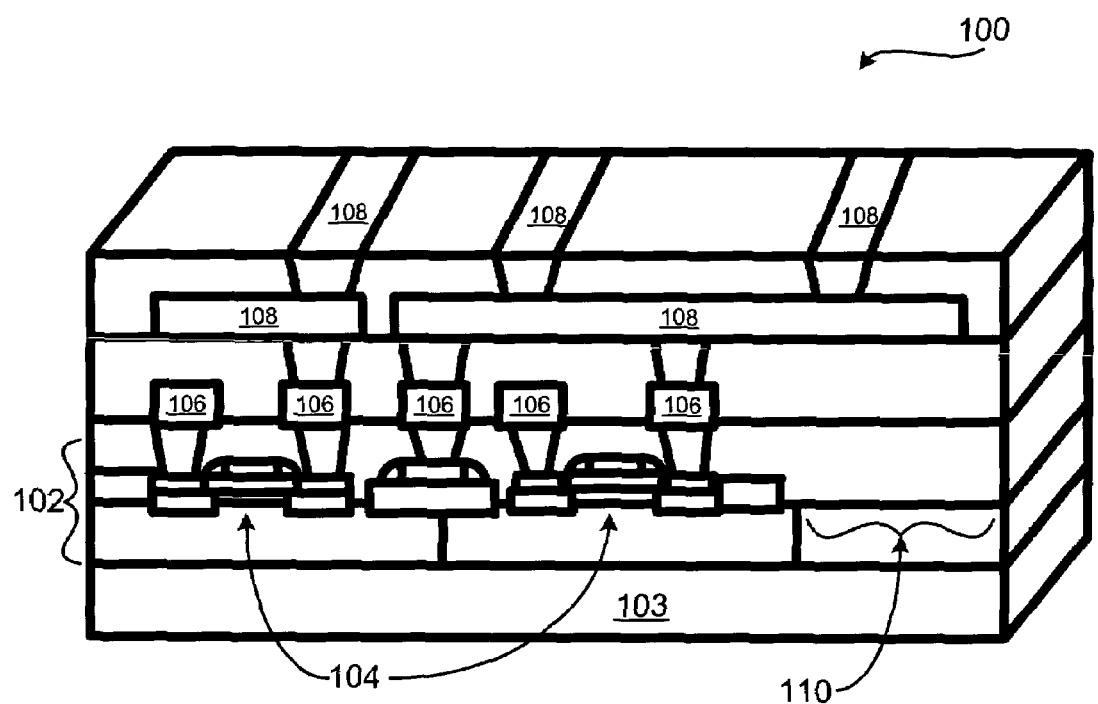
FIG. 1 illustrates a wire limited silicon chip.

In this description, like numerals refer to like elements throughout the several views. The invention introduces a way to provide a reliable computing without increasing data path wiring density and this is accomplished by tapping to unused devices under wire limited functional units. Because of problems with data path scaling, many on-chip devices are left unused under the data paths. FIG. 1 illustrates a silicon chip 100 with the above stated problem. A silicon chip 100 is generally implemented on a substrate layer 103 where additional layers are formed by different depositions. The functional devices are implemented within a few functional layers 102, where gates 104 are formed. The functional devices are connected to registers and other functional devices through contacts 106 and metal interconnects (buses) 108. Because of the bus scaling problem, often some space 110 within the functional layers 102, where additional devices (gates) can be implemented, are left unused.

No additional functional units can be implemented using these devices because the additional functional units would require additional data paths connecting these additional functional units with a new set of data registers. However, a duplicate of an existing functional unit can be implemented using these unused devices, because these duplicated functional units are connected to the same data registers using the same data paths.

A processor, implemented in a single silicon chip, according to the invention provides a fault tolerant computing without increasing the footprint. By using previous unused devices in a silicon chip to implement a duplicate functional unit, the processor can provide reliable computing even if the functional unit detects an error condition. The processor simply switches the computing function to the duplicated functional unit and processing continues with the processor taking the inputs and providing a result as before. The swapping from one functional unit to its duplicate functional unit is completely transparent to other components.

Figure 2:
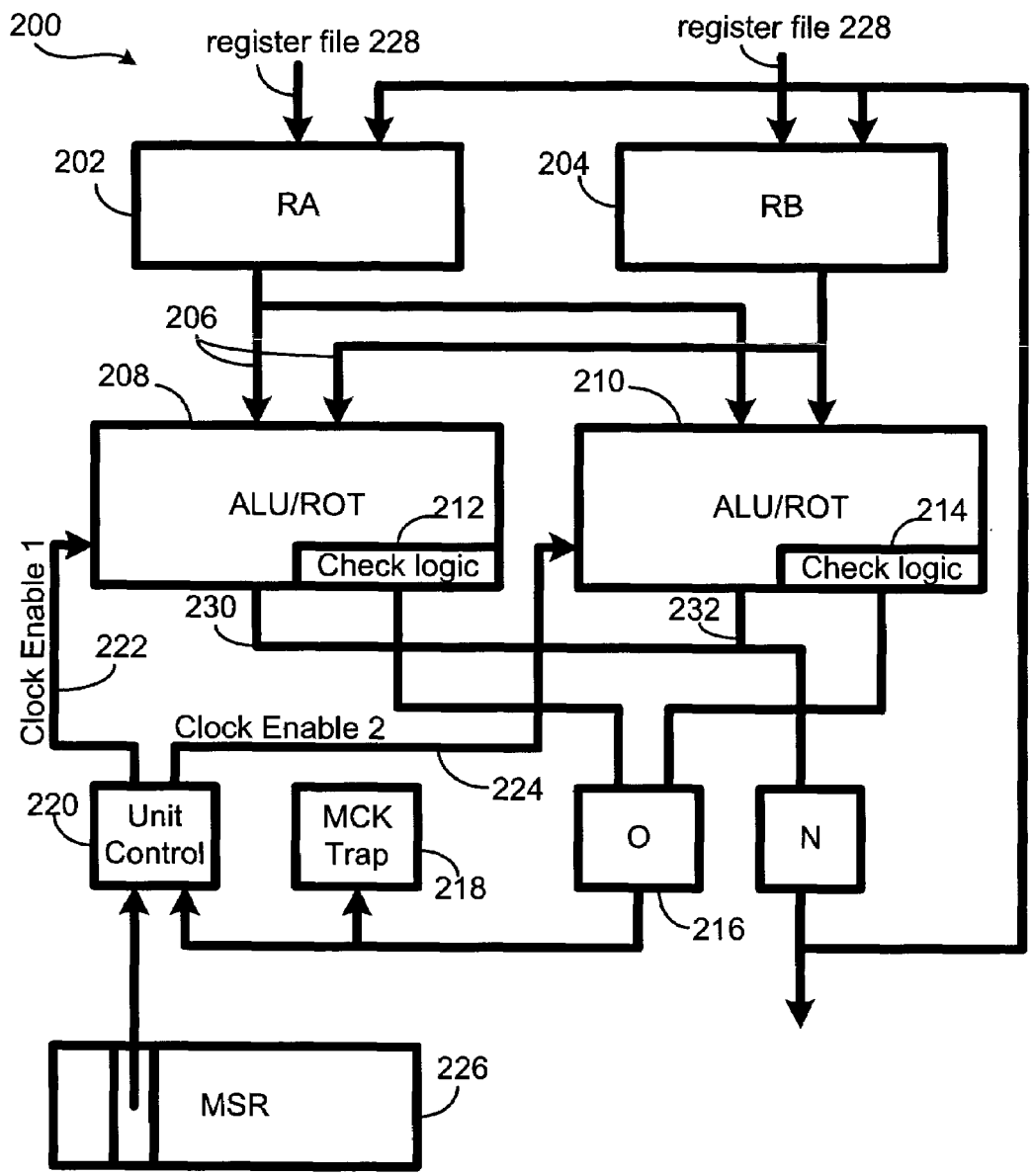
FIG. 2 illustrates architecture of a processor according to the invention.

FIG. 2 illustrates architecture 200 of a processor according to the invention. The processor has two data registers, RA 202 and RB 204, for storing operands for a functional unit 208 and its duplicate unit 210. The data registers 202, 204 are connected to the functional units 208, 210 through a set of data paths 206. The functional unit 208 includes an error condition indicator 212. If an error condition occurs in the functional unit 208, the error condition indicator 212 will be set. The functional units 208, 210 may be an arithmetic logic unit, a shifter, a rotator, or components that provide other specialized functions.

The processor is implemented in a multi-layer silicon chip. The set of data paths 206 is generally implemented in higher layers, while the functional unit 208 and registers are implemented in a transistor layer. The size of the set of data paths 206 defines an area in this multi-layer silicon chip, which generally is larger than the area needed to implement one functional unit and other accessories necessary to implement the functional unit 208. The second functional unit 210 is implemented in a different area in the transistor layer under the set of data paths 206. Essentially, the two functional units 208, 210 are placed within the area needed for one single functional unit.

The processor receives operands from the data registers 202 and/or 204 and performs an arithmetic/logic operation and the output 230 of the operation is forwarded to other units for processing or fed back to the data registers 202 and 204 for further processing. The data registers 202 and 204 may also receive data from register files 228 or other computing components (not shown).

The output from one error condition indicator 212 and the output from other error condition indicator 214 are used to control a unit enabling logic 220. If one functional unit 208 detects an error condition, the unit enabling logic 220 disables the functional unit 208 and enables the duplicate functional unit 210. The enabling and disabling are accomplished by enabling/disabling clock signals to the respective unit. The enabling and disabling may also be accomplished by isolating the functional unit with an error condition from the rest of the processor computing logic.

Alternatively, the error condition may be trapped by a register 218, a machine check trap which is used to trigger a diagnostic routine on the functional unit with error. At the end of the diagnostic routine, software (operating system) may set a bit, a unit selecting indicator, in the machine state register (MSR) 226 to trigger the swapping of functional units.

Figure 3:
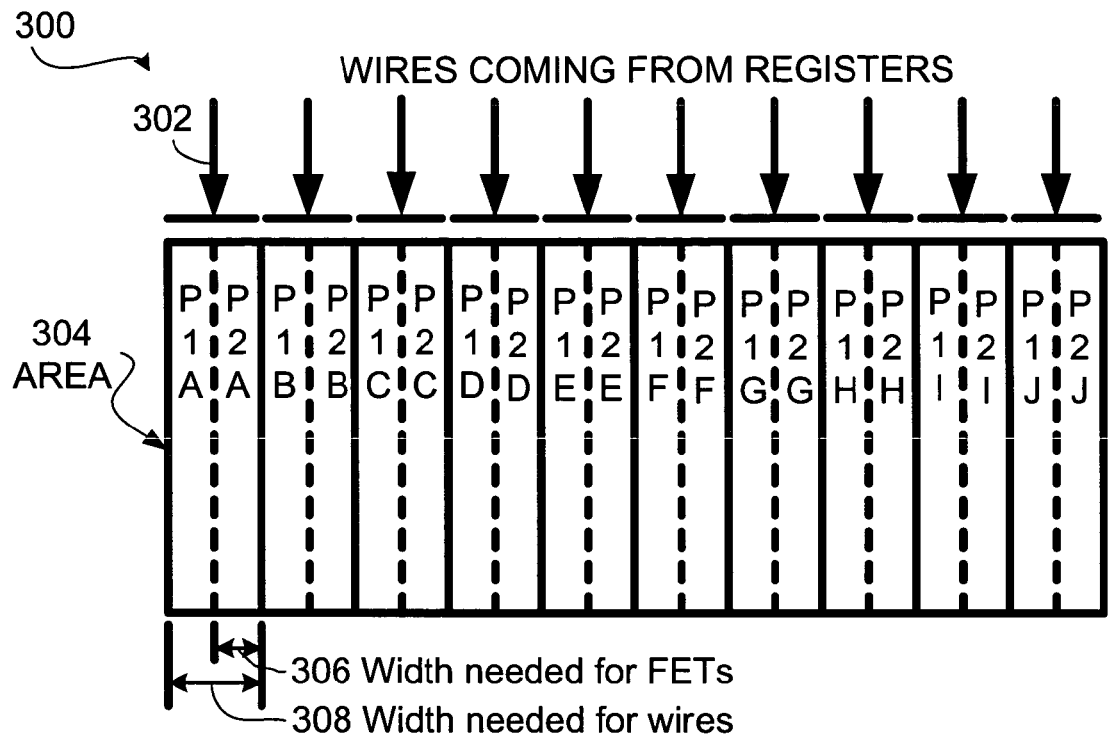
FIG. 3 illustrates a comparison between areas needed for wires and FETs.

FIG. 3 is a comparison 300 (not to scale) between the chip real estate needed for connecting wires from registers and the chip real estate needed for FETs. Generally, the area needed for wires 308 is significantly larger than the area 306 needed for FETs, as shown. P1A-P1J represents the FETs of an interdigitated processing element and P2A-P2J represent the FETs of another interdigitated processing element.

Figure 4:
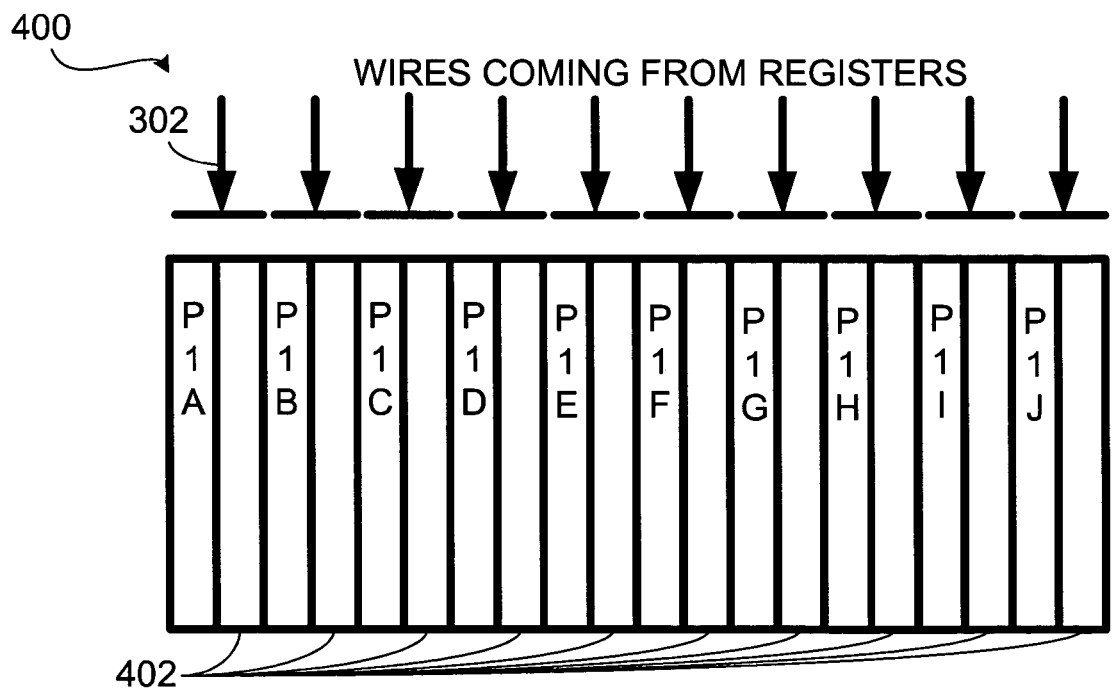
FIG. 4 illustrates an embodiment of the invention.

FIG. 4 shows the effect of implementing one interdigitated processor and the plurality of wires connected to this processor. For the processor to handle inputs 302 processing elements P1A-P1J are needed. However, at least double the area is needed to support the inputs 302, and areas 402 are left unused, which can be employed to implement an additional processor that would be identical to the first processor. The two processors would accordingly occupy the area required to implement the first processor and its associated data paths.

In the context of the invention, the method may be implemented, for example, by operating portion(s) of a computing device to execute a sequence of machine-readable instructions. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

What is claimed is:

1. A runtime repairable processor within a single silicon chip, comprising:
   a first data path of a plurality of data paths, said first data path defining a first area on the silicon chip by its wire width;
   a plurality of data registers disposed on the silicon chip and coupled to the plurality of data paths;
   a first functional unit comprising a plurality of bit-level operational units on the silicon chip and coupled to the plurality of data paths;
   a second functional unit that is a duplicate of the first functional unit, said second functional unit comprising a plurality of duplicate bit-level operational units, and that is disposed on the silicon chip, the second functional unit coupled to the plurality of data paths, wherein a first bit-level operational unit of the first functional unit and a first duplicate bit-level operational unit of the second functional unit are both contained within the first area; and
   an enabling control logic that is configured to disable the first functional unit and to enable the second functional unit when a failure is detected with the first functional unit.

2. The runtime repairable processor of claim 1, wherein the enabling control logic enables the second functional unit by enabling a clock signal to the second functional unit.

3. The runtime repairable processor of claim 1, further comprising a machine state register including a unit selecting indicator, the unit selecting indicator configured to control the enabling control logic.

4. The runtime repairable processor of claim 3, wherein the unit selecting indicator is set by software.

5. The runtime repairable processor of claim 1, wherein the first functional unit further comprises a first error indicator and the second functional unit further comprises a second error indicator.

6. The runtime repairable processor of claim 5, further comprising a machine check trap wherein the first error indicator and the second error indicator are stored, the machine check trap configured to initiate a software diagnostic routine.

7. The runtime repairable processor of claim 1, wherein the first functional unit is an adder.

8. The runtime repairable processor of claim 1, wherein the first functional unit is a rotator.

9. The runtime repairable processor of claim 1, wherein the first functional unit is an arithmetic logic unit.

10. A method for providing a fault tolerant computing runtime repairable processor on a single silicon chip, comprising the steps of:
    connecting a plurality of data registers to a first functional unit comprising a plurality of bit-level operational units through a plurality of data paths, wherein a first area of the silicon chip is defined by the wire width of a first datapath of the plurality of data paths, the plurality of data registers and the first functional unit disposed on the silicon chip;
    placing a second functional unit, that is a duplicate of the first functional unit comprising a plurality of duplicate bit-level operational units, on the silicon chip, wherein a first bit-level operational unit of the first functional unit and a first duplicate bit-level operational unit of the second functional unit are both contained within the first area;

connecting the plurality of data registers to the second functional unit through the plurality of data paths;

detecting an error condition in the first functional unit;

in response to detecting the error condition, disabling the first functional unit and enabling the second functional computing unit.

11. The method of claim 10, wherein the disabling step and the enabling step are controlled by a machine state register.

12. The method of claim 10, further comprising the step of, in response to detecting an error condition, setting a unit swapping indicator in a machine state register.

13. The method of claim 10, further comprising the step of, in response to detecting an error condition, executing a diagnostic procedure.

14. The method of claim 10, wherein the step of disabling the first functional unit further comprises the step of disabling a clock signal to the first functional unit.

15. The method of claim 10, wherein the step of enabling the second functional unit farther comprises the step of enabling a clock signal to the second functional unit.

16. The method of claim 10, further comprising the steps of:

trapping the error condition in a machine check trap; and in response to trapping the error condition, causing a diagnostic routine to run on the first functional unit.

* * * * *